Aug. 9, 1932.  F. X. LAUTERBUR ET AL  1,870,257
DOUGH MOLDING APPARATUS
Filed May 18, 1931     3 Sheets-Sheet 1
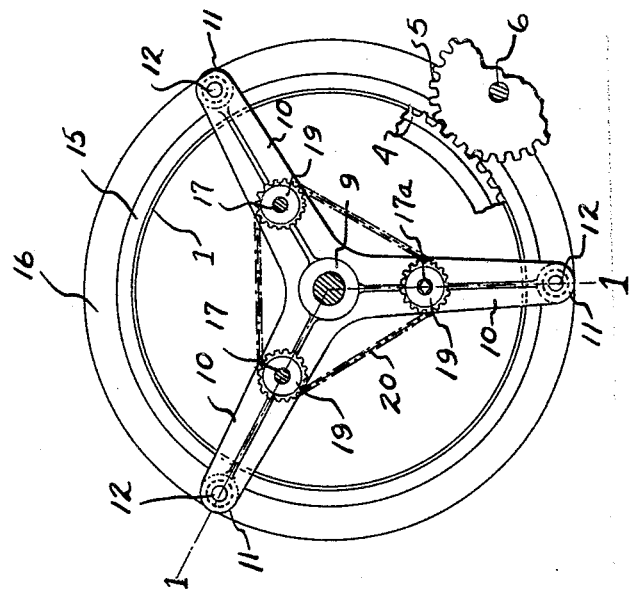
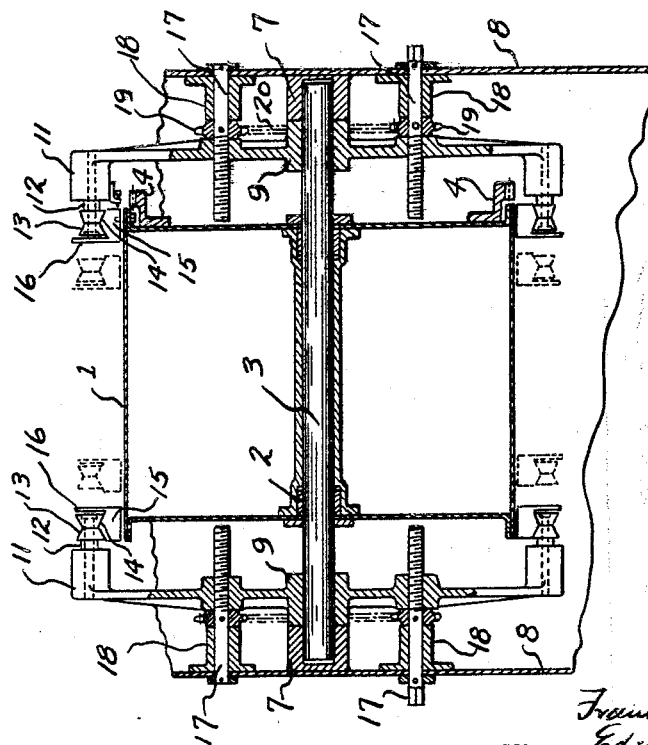
INVENTOR.
Frank X. Lauterbur
Edward J. Lauterbur
BY
ATTORNEY.

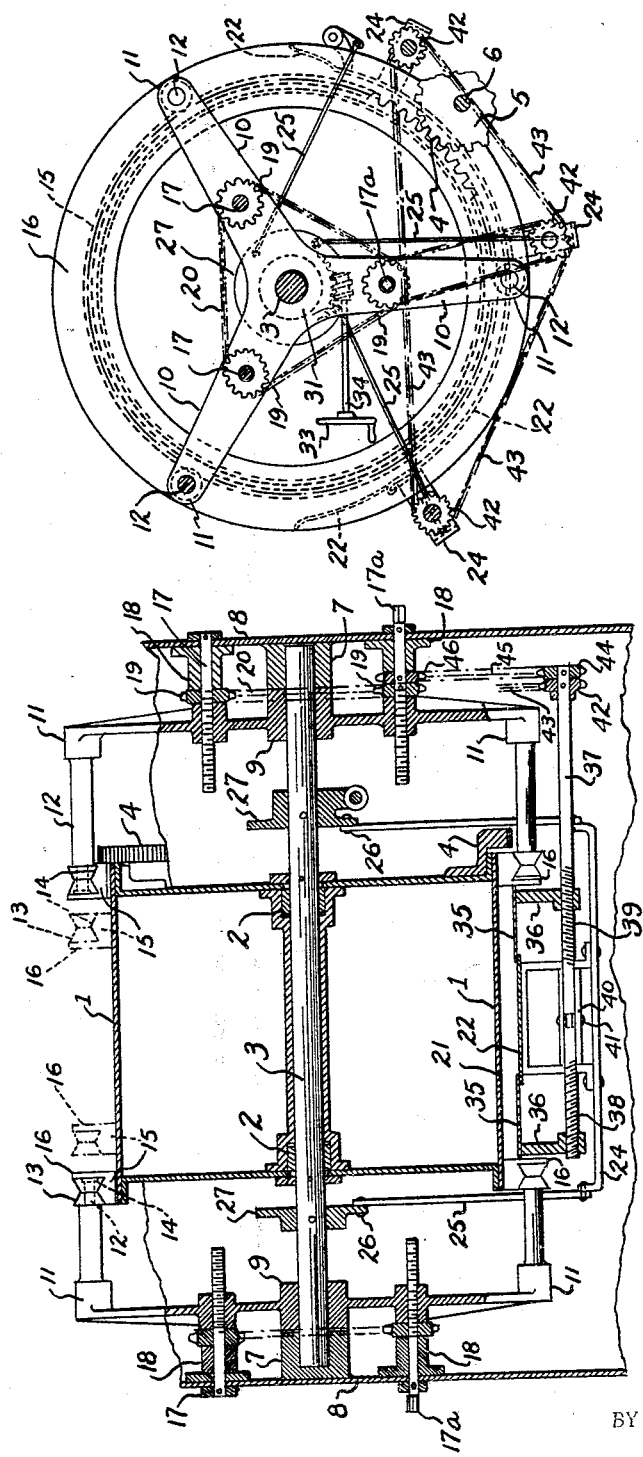

Patented Aug. 9, 1932

1,870,257

UNITED STATES PATENT OFFICE

FRANK X. LAUTERBUR AND EDWARD J. LAUTERBUR, OF SIDNEY, OHIO

DOUGH MOLDING APPARATUS

Application filed May 18, 1931. Serial No. 538,176.

Our invention relates to dough molding apparatus, and particularly to dough molding apparatus of the drum type.

In the molding of dough to form loaves of bread, it is highly desirable that the machine be provided with adjustments so that loaves of desired shape, contour and length may be molded. In the Lauterbur Patent No. 1,432,874, there is disclosed a dough molding machine in which the length of the molded loaves may be varied. Further, in the Lauterbur Patent No. 1,537,614, there is disclosed a pressure box for the loaves during the molding operation, which is movable along with the movable conveyor belt. There is also shown in the Lauterbur Patent No. 1,585,724, a loaf-molding machine of the drum type, in which flange members forming the sides of the pressure box, are rotatable at different speeds than the drum.

It is the object of our invention, as described herein, to provide a loaf-molding machine of the drum type in which the sides of the pressure box will be free-floating, so that if the ends of the loaves create sufficient pressure against the sides of the pressure compartment, the side members will travel along with the molded loaf and prevent the ends of the loaf from being dragged forward as in the case of flanges traveling with the drum, or backward in the case of stationary flanges, with a tendency in either case to deform the molded dough batch.

It is a further object of our invention to provide the free-floating side members of the pressure compartment so that for certain types of molding they may either be secured in fixed position so as not to rotate, or they may be secured to the drum so that they will travel at the same peripheral speed as the drum. Thus it is our idea to provide an entirely flexible unit, in which control of the movement of the sides of the pressure box may be varied to suit the desired molding conditions.

In combination with our idea of a free-floating flange, it is a further object of our invention to provide mechanism which will be conjointly adjustable with the side flanges for varying the width of the pressure board against which the movable drum rolls the sides of the molded loaf.

It is further our object, in combination with the unitary adjustable features noted, to provide means for regulating the depth of the opening in the pressure compartment. The above objects and other objects to which reference will be made in the ensuing disclosure, we accomplish by that certain combination and arrangement of parts of which we have shown a preferred embodiment.

Referring to the drawings:—

Figure 1 is a sectional view as would be indicated if taken along the planes of the lines 1, 1 in Fig. 2, in which only the mechanism for controlling the free-floating side pressure members of the pressure compartment is indicated.

Fig. 2 is an end elevation showing the mechanism for controlling the lengthwise dimensions of the pressure compartment.

Figure 4:
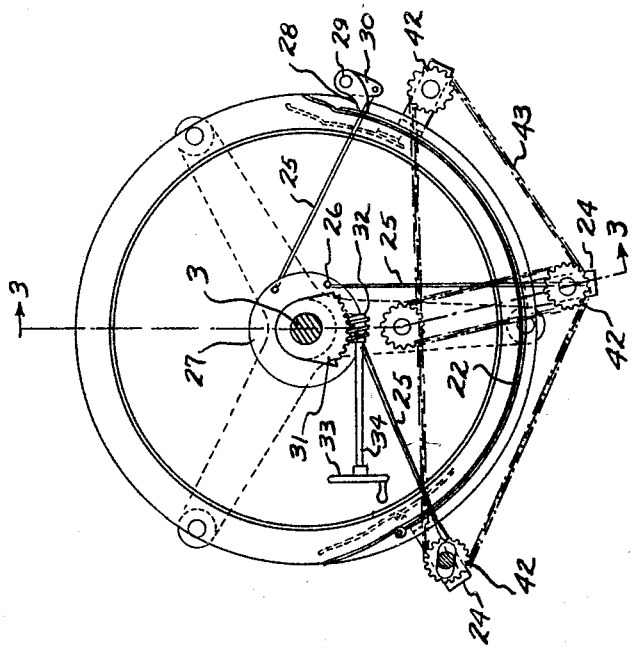
Figure 3:
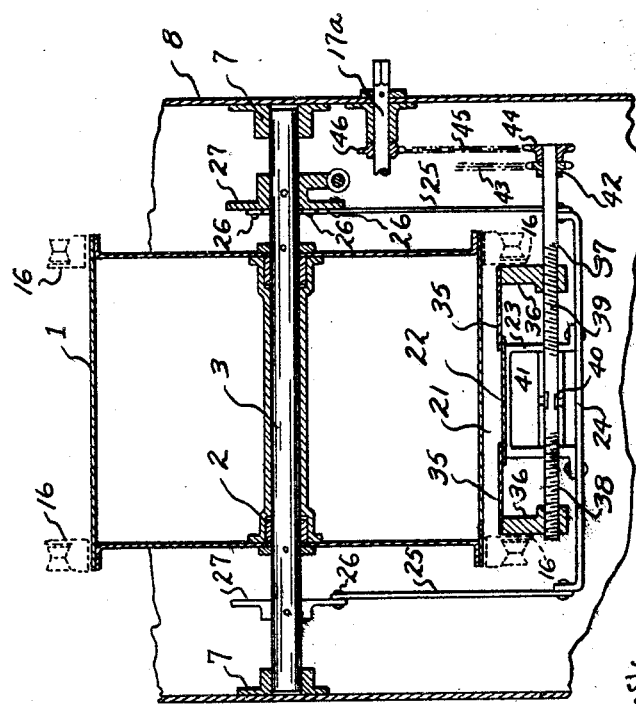

Fig. 3 is a sectional view as would be indicated if taken along the planes of the lines 3, 3 in Fig. 4, showing the mechanism for controlling the width of the pressure board and the depth of the pressure compartment, together with such details of the mechanism shown in Figs. 1 and 2 as will make it readily understood how a unitary adjustment for the lengthwise dimension of the pressure compartment can be accomplished.

Fig. 4 is an end elevation of the part shown in section in Fig. 3.

Fig. 5 is a sectional view of the complete machine shown in detail in Figs. 1 and 3.

Fig. 6 is a side elevation of the complete machine shown in Fig. 5.

Referring to Fig. 1, we have indicated the molding drum 1 mounted in suitable bearings 2, and rotatable on the shaft 3, by means of a worm gear 4, rotated by a worm 5 mounted on the drive shaft 6.

The shaft 3 is journaled in suitable bearings 7, on supporting frame members 8. We have shown supporting spiders having hubs 9 mounted for free movement relative to the shaft 3. The hubs 9 have spider arms 10, which have bosses 11 at their ends, which carry studs 12, on which are mounted rollers 13.

The rollers 13 are preferably formed with angular grooves which engage the machine surface 14 of the ring members 15, which have a free fit around the periphery of the drum 1. Extending up from the rings 15, there are annular flanges 16 which form the sides of the pressure compartment.

In order to adjust the member 16 for varying the sides of the pressure compartment, we have provided a series of screws 17, 17, 17a, which are journaled in bearings 18 mounted on the frame members 8. Sprockets 19 are mounted on the shaft of the screws 17, 17, 17a which are connected by a chain 20, so that by squaring the end of the screw 17a and providing a suitable handle for rotating this screw, the sprocket and chain in connection between the three screws will cause the three sets of rollers 13 to move together inwardly and outwardly, carrying the side pressure flange 16 inwardly and outwardly, as will be obvious, to vary the widthwise dimension of the pressure compartment.

If reference now be had to Fig. 3, in which the pressure compartment is clearly shown, it will be noted that the annular flanges 16, indicated in dotted lines, form the sides of the molding compartment indicated at 21. The pressure board against which the loaf is molded by the rotation of the drum, must also be moved in and out with the adjustment of the annular flanges 16. The pressure board is composed of a medial member 22 mounted on brackets 23. The brackets are carried on members 24, which are connected with straps 25 to eccentrically arranged pins 26, on discs 27, which are fixedly mounted on the shaft 3, so that with rotation of the shaft 3 in its journal 7, the middle pressure board member will be moved inwardly or outwardly at the three positions indicated in Fig. 4. The middle and back supports 23 for the member 22 will be moved directly with the straps 25, extending out to the ends of the middle pressure member 24. The front pressure member is moved by means of cams 28, mounted on shafts 29, the shafts also having crank arms 30, to which the straps 25 are connected.

For rotating the shaft 3, we have provided a gear segment 31, which is indicated by a worm 32, which may be rotated by turning a handwheel 33, mounted on the end of a shaft 34, on which the worm 32 is fixedly mounted. Since the discs 27 on each side of the drum are fixedly mounted on the shaft 3, rotation of the gear segment 31 will cause uniform adjustment of the member 22.

The sides of the pressure board member indicated at 35 are mounted on supports 36, which have threaded openings extending through them, and a shaft 37 threaded right and left, as indicated at 38, 39, engages the threaded openings in the members 36. The shaft 37 has an inturned flange portion 40, which is engaged by a collar 41, mounted on the bracket 23, so that with rotation of the shaft 37 in one direction, the supports 36 will be moved towards each other, and with rotation in the other direction, the members 36 will be moved apart.

Each of the shafts 37 have fixedly mounted thereon sprockets 42, and the sprockets are connected by a chain 43.

By rotating one of the shafts 37, it will be obvious that the other two shafts 37 will also be rotated, and that the side members 35 of the pressure board will be moved towards each other, or apart, as desired. By mounting a sprocket 44 on one of the shafts 37, with a chain 45 extending to a sprocket 46, mounted on the shaft 17a, it will be obvious that if the threads on the member 17a and the threads on the shafts 37 correspond, a uniform adjustment of the members 16, together with the members 35, may be accomplished.

By forming the members 35 in accordance with the teachings in our application, Ser. No. 515,271, filed February 12, 1931, not only the lateral dimensions of the pressure compartment may be varied by the unitary adjustment, but the tapering shape of the molded loaf may be controlled as desired.

Having thus described our invention, what we claim as new and desire to secure by Letters Patent, is:—

1. In a drum-type dough molding machine, the combination of a rotatable drum, means forming an opposed side wall of a pressure molding compartment, and means forming end walls of said compartment, said last noted means mounted in free-floating position relative to said drum.

2. In a drum-type dough molding machine, the combination of a rotatable drum, means forming an opposed side wall of a pressure molding compartment, and means forming end walls of said compartment, said last noted means mounted in free-floating position relative to said drum, said means comprising ring members each having an annular flange forming an end wall of said pressure compartment.

3. In a drum-type dough molding machine, the combination of a rotatable drum, means forming an opposed side wall of a pressure molding compartment, and means forming end walls of said compartment, said last noted means mounted in free-floating position relative to said drum, and means for adjusting the lateral position of said end wall forming means relative to said drum.

4. In a drum-type dough molding machine, the combination of a rotatable drum, means forming an opposed side wall of a pressure molding compartment, and means forming end walls of said compartment, said last noted means mounted in free-floating position relative to said drum, and means for adjusting the lateral position of said end wall forming means relative to said drum, said adjusting means effective to vary the width of said opposed side wall forming means.

5. In a drum-type dough molding machine, the combination of a rotatable drum, means forming an opposed side wall of a pressure molding compartment, and means forming end walls of said compartment, said last noted means mounted in free-floating position relative to said drum, and means for adjusting the lateral position of said end wall forming means relative to said drum, said adjusting means effective to vary the width of said opposed side wall forming means, and independent means for adjusting the position of said side wall forming means for varying the depth of said pressure molding compartment.

6. In a dough molding machine, a drum conveyor, a curved pressure molding compartment, and means forming ends of said compartment mounted in free-floating position relative to said drum.

7. In a dough molding machine, a drum conveyor, a curved pressure molding compartment, and means forming ends of said compartment mounted in free-floating position relative to said drum, said pressure molding compartment having a pressure member opposed to the surface of said drum, and means for adjusting the width of said member.

8. In a dough molding machine, a drum conveyor, a curved pressure molding compartment, and means forming ends of said compartment mounted in free-floating position relative to said drum, and means for varying the distance apart of the ends of said compartment.

9. In a dough molding machine, a drum conveyor, a curved pressure molding compartment, and means forming ends of said compartment mounted in free-floating position relative to said drum, said pressure molding compartment having a pressure member opposed to the surface of said drum, and means for adjusting the width of said member, and means for varying the distance apart of the ends of said compartment, said width adjusting and distance varying means having a unitary control.

10. A dough molding machine having a drum conveyor, ring members forming annular end walls of a pressure compartment, and means for mounting said ring members in free-floating position relative to said drum.

11. A dough molding machine having a drum conveyor, ring members forming annular end walls of a pressure compartment, and means for mounting said ring members in free-floating position relative to said drum, and means for moving said ring members to and from each other.

12. A dough molding machine having a drum conveyor, ring members forming annular end walls of a pressure compartment, and means for mounting said ring members in free-floating position relative to said drum, and means forming an opposed pressure member in said compartment provided with means for varying the width of said member from said drum.

13. A dough molding machine having a drum conveyor, ring members forming annular end walls of a pressure compartment, and means for mounting said ring members in free-floating position relative to said drum, and means forming an opposed pressure member in said compartment provided with means for varying the width of said member from said drum, and a unitary control for moving said pressure board and said ring members.

14. A dough molding machine having, in combination, a drum conveyor, and means defining the ends of a molding compartment mounted in free-floating position relative to said drum.

15. A dough molding machine having, in combination, a drum conveyor, and means defining the ends of a molding compartment mounted in free-floating position relative to said drum, said means adjustable for varying the width of said compartment.

16. A dough molding machine having, in combination, a drum conveyor, and means defining the ends of a molding compartment mounted in free-floating position relative to said drum, said means adjustable for varying the width of said compartment, and means defining a curved outside wall of said compartment opposed to the periphery of said drum, said means adjustable for varying the depth of said compartment.

17. A dough molding machine having, in combination, a drum conveyor, and means defining the ends of a molding compartment mounted in free-floating position relative to said drum, said means adjustable for varying the width of said compartment, and means defining a curved outside wall of said compartment opposed to the periphery of said drum, said means adjustable for varying the depth of said compartment, and a unitary control for said means for adjusting the depth dimensions of said compartment.

FRANK X. LAUTERBUR.
EDWARD J. LAUTERBUR.